United States Patent
Marschall et al.

(10) Patent No.: US 8,038,181 B2
(45) Date of Patent: Oct. 18, 2011

(54) CONNECTING ARRANGEMENT FOR A FLUID-CONDUCTING TUBE

(75) Inventors: Peter Marschall, Heilbronn (DE); Claus Röck, Sulzbach-Murr (DE)

(73) Assignee: ContiTech Kuehner GmbH & Cie. KG, Oppenweiler (DE)

( * ) Notice: Subject to any disclaimer, the term of this patent is extended or adjusted under 35 U.S.C. 154(b) by 0 days.

(21) Appl. No.: 12/457,798

(22) Filed: Jun. 22, 2009

(65) Prior Publication Data
US 2009/0322075 A1    Dec. 31, 2009

Related U.S. Application Data

(63) Continuation of application No. PCT/EP2007/061985, filed on Nov. 7, 2007.

(30) Foreign Application Priority Data

Dec. 22, 2006  (DE) .......................... 10 2006 061 112

(51) Int. Cl.
F16L 13/14  (2006.01)
F16L 41/12  (2006.01)
(52) U.S. Cl. ................... 285/382; 285/124.2; 285/124.3
(58) Field of Classification Search .... 285/124.1–124.5, 285/382, 205–209
See application file for complete search history.

(56) References Cited

U.S. PATENT DOCUMENTS

| | | | |
|---|---|---|---|
| 3,521,332 A | | 7/1970 | Kramer |
| 4,142,843 A | * | 3/1979 | Kish .............................. 417/313 |
| 4,314,220 A | * | 2/1982 | Ito et al. .......................... 336/65 |
| 4,468,054 A | * | 8/1984 | Orth ............................ 285/124.3 |
| 5,174,612 A | | 12/1992 | Schnell |
| 5,294,156 A | * | 3/1994 | Kumazaki et al. .......... 285/124.2 |
| 5,556,138 A | * | 9/1996 | Nakajima et al. ........... 285/124.4 |
| 5,593,279 A | * | 1/1997 | Hayashi ...................... 415/213.1 |
| 5,769,465 A | * | 6/1998 | Schultz et al. ................ 285/328 |
| 5,774,982 A | * | 7/1998 | Hutchison et al. .......... 29/890.06 |
| 6,082,333 A | * | 7/2000 | Vattelana et al. .............. 123/456 |
| 6,206,437 B1 | * | 3/2001 | Humphreys ................... 285/353 |
| 6,682,100 B2 | * | 1/2004 | Wood et al. ..................... 285/26 |
| 7,425,021 B2 | * | 9/2008 | Yamanashi et al. ......... 285/124.1 |
| 7,469,934 B2 | * | 12/2008 | Inaba et al. ................. 285/124.3 |
| 2003/0080564 A1 | * | 5/2003 | Izumi et al. ................... 285/382 |
| 2004/0036277 A1 | * | 2/2004 | Inaba et al. ................. 285/124.4 |
| 2005/0029806 A1 | | 2/2005 | Yamanashi et al. |
| 2006/0108796 A1 | | 5/2006 | Welle |

FOREIGN PATENT DOCUMENTS

| | | |
|---|---|---|
| DE | 81 33 297 | 2/1983 |
| EP | 0 969 188 | 1/2000 |
| GB | 1 403 714 | 8/1975 |
| GB | 2 108 617 | 5/1983 |

* cited by examiner

*Primary Examiner* — James Hewitt
(74) *Attorney, Agent, or Firm* — Walter Ottesen

(57) ABSTRACT

A connecting arrangement for fluid-conducting tubes (1, 2) has a further fluid transporting component (16). The fluid-conducting tube (1, 2) has at least one collar (3, 4) facing radially outwardly which can be clamped against the further fluid transporting component (16) with the aid of a holder (5). The holder (5) has at least one U-shaped lateral receptacle (6, 7) formed by two arms (12). The predetermined length of the arms (12) is dimensioned such as to enclose more than half of the fluid-conducting tube (1, 2) during plastic deformation. The U-shaped receptacle (6, 7) has at least one relief region (13) in which holes, grooves, cavities or other material reductions are arranged. The cross section of the arms (12) changes little during deformation due to the relief regions because upset material can flow into the same.

6 Claims, 3 Drawing Sheets

CONNECTING ARRANGEMENT FOR A FLUID-CONDUCTING TUBE

CROSS REFERENCE TO RELATED APPLICATIONS

This application is a continuation application of international patent application PCT/EP 2007/061985, filed Nov. 7, 2007, designating the United States and claiming priority from German application 10 2006 061 112.8, filed Dec. 22, 2006, and the entire content of both applications is incorporated herein by reference.

FIELD OF THE INVENTION

The invention relates to a connecting arrangement for fluid-conducting tubes having a further fluid-conducting component wherein the fluid-conducting tube has at least one collar facing radially outwardly which can be clamped axially against the further fluid-conducting component by a holder.

BACKGROUND OF THE INVENTION

Such connector arrangements have been in use for a long time in numerous embodiments.

U.S. Pat. No. 5,174,612 discloses a typical connecting arrangement wherein the holder is configured as a holding plate. The holding plate completely surrounds a tube and, by means of a laterally arranged screw connection, presses against a bead of a tube and thereby firmly holds the tube in a bore of the further fluid-conducting component.

However, a holding plate of this kind can only be used with tubes which either have a bead only at one end or in which a second bead is formed on the fluid line only once the holding plate has been pushed onto the fluid line.

DE 81 33 297 U1 presents a flange connection in which the holding device is comprised of two flange halves which can be placed around a tube with a collar and which can then be screwed to a further fluid-conducting component. With this arrangement, it is possible for the flange connection to also be used on tubes with two collars. However, a plurality of screw connections is required here in order to securely retain the tube.

United States patent application publication 2006/0108796 discloses a connecting device in which a tube is pressed with, for example, a soldered-on sealing flange, axially into a further fluid-conducting component by a fork-shaped retaining lever and a screw connection.

However, in all of these arrangements, it is necessary for the fluid-conducting tube to be held separately in its position until the retaining lever or the flanges are in position. The tube would otherwise fall out of position. It is therefore necessary to handle a plurality of separate parts during assembly.

SUMMARY OF THE INVENTION

The invention is based on the object of providing a connecting arrangement of the kind referred to initially herein which permits a reliable, pressure-tight connection of the tube to the further fluid-conducting component with a simple assembly, even to two fluid-conducting tubes having respective collars.

The connecting arrangement of the invention is for connecting a fluid-conducting tube to a component for conducting the fluid further. The connecting arrangement includes: a collar formed on the fluid-conducting tube so as to project radially outwardly therefrom; a holder for clamping the collar axially against the component; the holder being a member having a body portion and having a bore formed in the body portion to accommodate a fastener for securing the holder to the component; the holder having two arms extending from the body portion laterally of the bore to define a U-shaped receptacle for receiving the fluid-conducting tube therein; and, the two arms extending from the body a predetermined length dimensioned to permit the arms to enclose and extend around more than half of the periphery of the fluid-conducting tube when the arms are plastically deformed.

This arrangement affords the advantage that the holder can be pushed laterally onto the tube and can be fastened to the tube by the plastic deformation of the arms of the U-shaped receptacle around the tube so that the holder is attachable to the tube so as to be inseparable therefrom.

In another embodiment of the invention, the U-shaped receptacle has at least one relief region in which gaps, grooves, cavities or other reductions of material are arranged.

It has been found that, during the plastic deformation of the arms, which usually have a rectangular or square cross section, an axial thickening of the cross section occurs in the partial region of the arms facing into the interior of the U-shape. This thickening occurs as a result of the tangential material upsetting which takes place in this region during the deformation. The axial contact surface of the holder, which is to press against the collar of the tube during the clamping process, is therefore no longer flat. In particular cases, therefore, for example under oscillating loading of the connection, a permanently pressure-tight connection of the air-conditioning tube to the further fluid-conducting component is no longer ensured.

In the relief regions according to the invention, it is possible during the upsetting of the regions assigned to the fluid-conducting tube for the material to flow together in the gaps, grooves, cavities or other material reductions. In this way, it is substantially prevented that a thickening of the cross section occurs on the arms. The local thickenings, which still occur between the relief regions, are usually so slight that they do not endanger the permanent reliable function of the connection.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
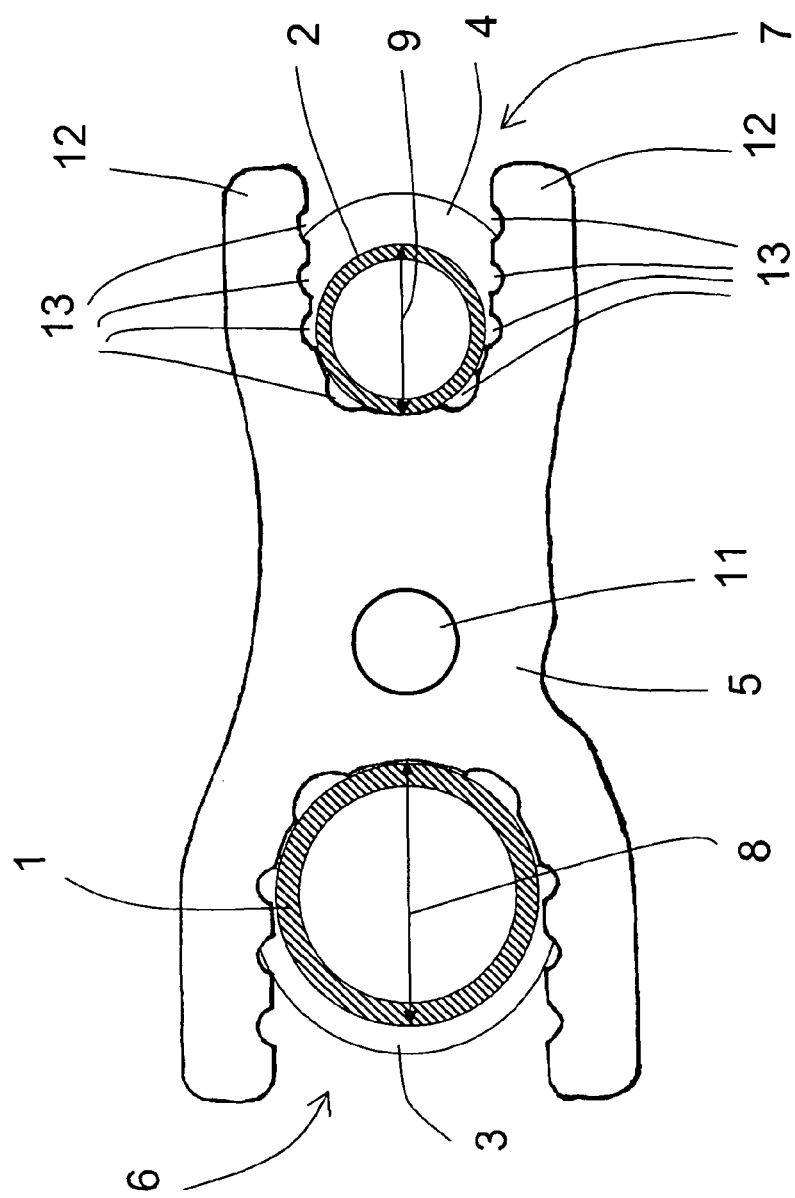
FIG. 1 shows a connecting arrangement according to the invention with a holder, before assembly, in a plan view from below.

The connecting arrangement shown in FIG. 1 has two fluid-conducting tubes 1 and 2 with respective upset, radially outwardly facing collars 3 and 4. A holder 5 is configured in the manner of a double fork, with two lateral, oppositely-lying U-shaped receptacles 6 and 7 being pushed onto the tubes 1 and 2. The receptacles 6 and 7 are adapted to the outer diameters of the tubes in such a way that the tubes 1 and 2 fit into the receptacles 6 and 7 without significant play, but the collars 3 and 4 do not fit into the receptacles 6 and 7. The holder 5 further has a bore 11 for screw connecting the holder 5.

Since the receptacles 6 and 7, in principle, act in the same way, only one receptacle, namely, receptacle 7, is described below.

The receptacle 7 has two arms 12 which have relief regions in the form of grooves 13 which are disposed on the wall of the arms 12, facing toward the fluid-conducting tube 2. The grooves run parallel to the main axis of the fluid-conducting tube 2 and extend away from the fluid-conducting tube 2 into the interior of the arms 12, with the width and depth of the grooves 13 corresponding to a predetermined dimension which is dependent on the diameter 9 of the fluid-conducting tube 2.

The holder 5 is arranged axially along the main axis of the fluid-conducting tube 2 in such a way as to bear against the collar 4.

Figure 2:
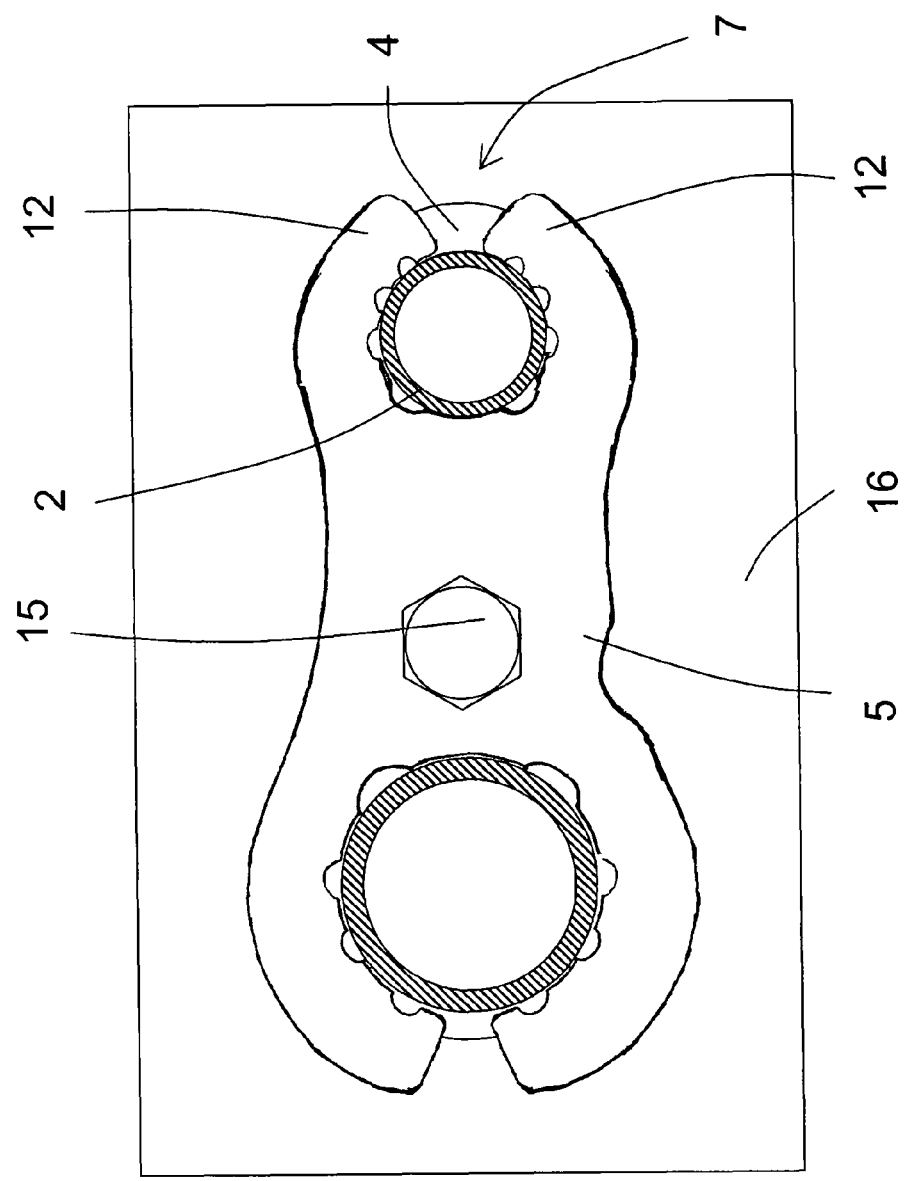
FIG. 2 shows the connecting arrangement according to the invention, in the assembled state, in a plan view from below; and, FIG. 3 shows the connecting arrangement according to the invention in the assembled state with right-hand portions thereof shown in longitudinal section.

FIG. 2 shows the connecting arrangement in the assembled state. The holder 5 is fixed to a coupling block 16 by a threaded fastener 15 through the bore 11 (not visible in FIG. 2). The arms 12 defining the receptacle 7 are plastically deformed in such a way as to almost completely surround the fluid-conducting tube 2, such that the tube 2 is fixedly and non-detachably connected to the holder 5.

As a result of the arms 12 surrounding the tube 2, the contact area of the arms 12 against the collar 4 is increased. Because the holder 5 is fixed by means of the threaded fastener 15, the tube 2 is pressed into the coupling block 16 via the arms 12 and the collar 4.

Figure 3:
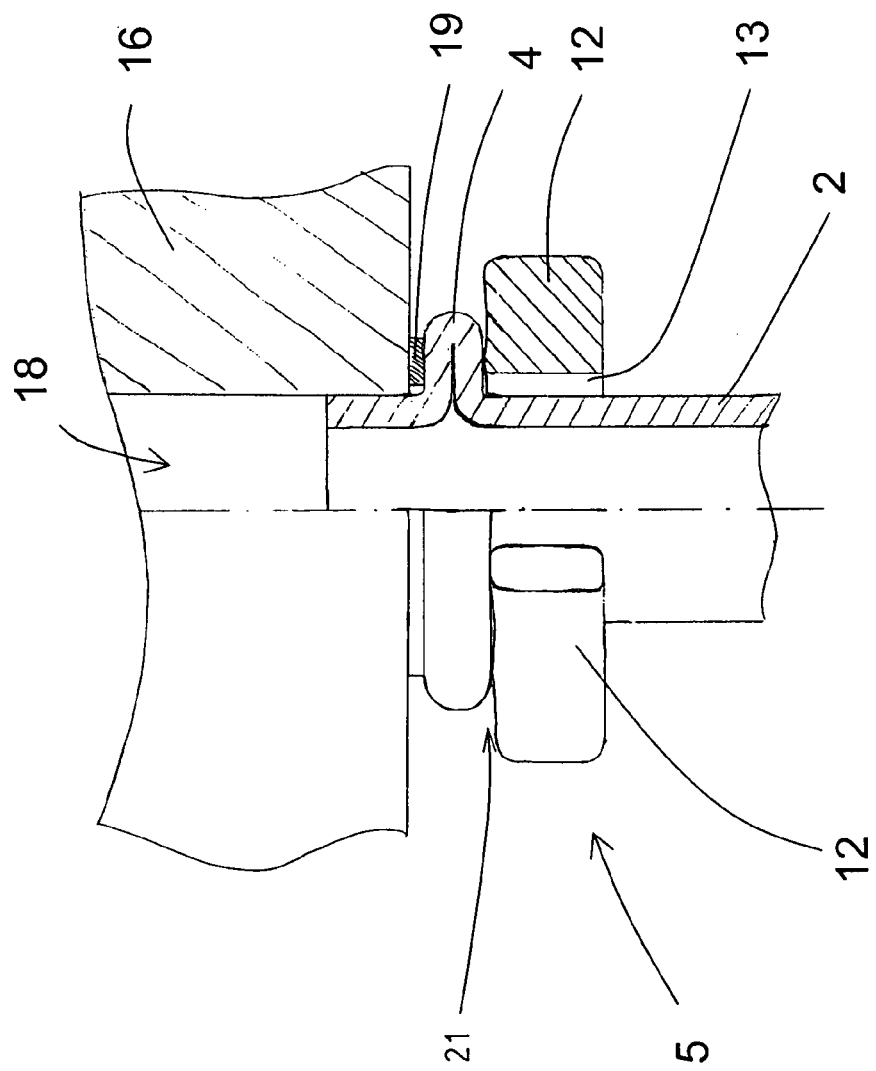

FIG. 3 shows the connecting arrangement in partial longitudinal section. The tube 2 is inserted into a bore 18 of the coupling block 16. A flat seal 19 is arranged between the coupling block 16 and the collar 4 of the tube 2. The holder 5 lies with its arms 12 against the collar 4 and presses the latter against the flat seal 19 and the coupling block 16.

The plastic deformation of the arms 12 around the fluid-conducting tube 2 is necessary, since the collar 4 would otherwise be pressed only partially against the flat seal 19 and the connection would not be seal tight. The material of the tube is displaced by upsetting because of the plastic deformation of the arms 12 at the inner regions of the tube 2. For this reason, the material of the arms substantially flows into the grooves 13 during the deformation. Only a negligibly small part of the upset material leads to an axial thickening of the arms 12 and this leads to an only slight non-uniformity 21 of the contact surface of the arms 12 against the collar 4. As a result of the grooves 13, this slight non-uniformity is considerably less than it would be without grooves 13, and does not impair the tightness and durability of the connection to a significant extent.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description 1, 2 Fluid-conducting tubes
3, 4 Collars of the fluid-conducting tubes 1, 2
5 Holder
6, 7 Receptacles of the holder 5
8, 9 Diameters of the fluid-conducting tubes 1, 2
11 Bore of the holder 5
12 Arms of the receptacles 6, 7
13 Grooves
15 Threaded fastener
16 Coupling block
18 Bore of the coupling block 16
19 Flat seal
21 Non-uniform thickening of the arms 12

What is claimed is:

1. A fluid-conducting tube joint structure comprising:
a fluid-conducting tube for conducting a fluid;
a component for accommodating said fluid-conducting tube to receive the fluid and conduct the fluid away from said fluid-conducting tube;
a collar formed on said fluid-conducting tube so as to project radially outwardly therefrom;
a holder for clamping said collar axially against said component;
said holder being a member having a body portion and having a bore formed in said body portion to accommodate a fastener for securing said holder to said component;
said holder having two arms extending from said body portion laterally of said bore to define a U-shaped receptacle for receiving said fluid-conducting tube therein;
said two arms extending from said body a predetermined length dimensioned to permit said arms to extend around more than half of the periphery of said fluid-conducting tube and grasp said fluid-conducting tube therebetween when said arms are plastically deformed; and,
said U-shaped receptacle having a relief region in each of said arms wherein a reduction of material is realized so as to permit material of said arms to flow into said relief regions during the plastic deformation thereof thereby substantially preventing the cross section of said arms to thicken as a consequence of the material flow.

2. The fluid-conducting tube joint structure of claim 1, further comprising a fastener passing through said bore to engage said component for tightly pulling said holder against said component so as to sandwich said collar therebetween.

3. The fluid-conducting tube joint structure of claim 2, further comprising an annular seal interposed between said collar and said component.

4. The fluid-conducting tube joint structure of claim 1, wherein said material reduction is defined by a plurality of gaps, slots or hollow spaces.

5. The fluid-conducting tube joint structure of claim 1, further comprising an annular seal interposed between said collar and said component.

6. The fluid-conducting tube joint structure of claim 1, wherein said U-shaped receptacle has a surface facing toward said fluid-conducting tube; said relief regions are formed in said surface; and, said relief regions are defined by a plurality of gaps or grooves formed in said surface into which material of said two arms flows during the plastic deformation thereof thereby substantially preventing the cross section of said arms to thicken as a consequence of the material flow.

* * * * *